(Model.)

J. H. HERMANCE.
Feed Mechanism for Circular Sawing Machines.

No. 239,497. Patented March 29, 1881.

Witnesses:

Inventor:
Joseph H. Hermance
By R. S. & A. P. Lacey
Att'ys

UNITED STATES PATENT OFFICE.

JOSEPH H. HERMANCE, OF TOLEDO, OHIO.

FEED MECHANISM FOR CIRCULAR SAWING MACHINES.

SPECIFICATION forming part of Letters Patent No. 239,497, dated March 29, 1881.

Application filed September 4, 1880. (Model.)

*To all whom it may concern:*

Be it known that I, JOSEPH H. HERMANCE, a citizen of the United States, resident at Toledo, in the county of Lucas and State of Ohio, have invented certain new and useful Improvements in Feeding Devices for Circular Saws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a new and adjustable device for feeding circular and other saws; and it consists in a frame hinged to the main stand, and in which is journaled the necessary feeding apparatus, all of which will be hereinafter explained, and specifically pointed out in the claims.

Figure 1:
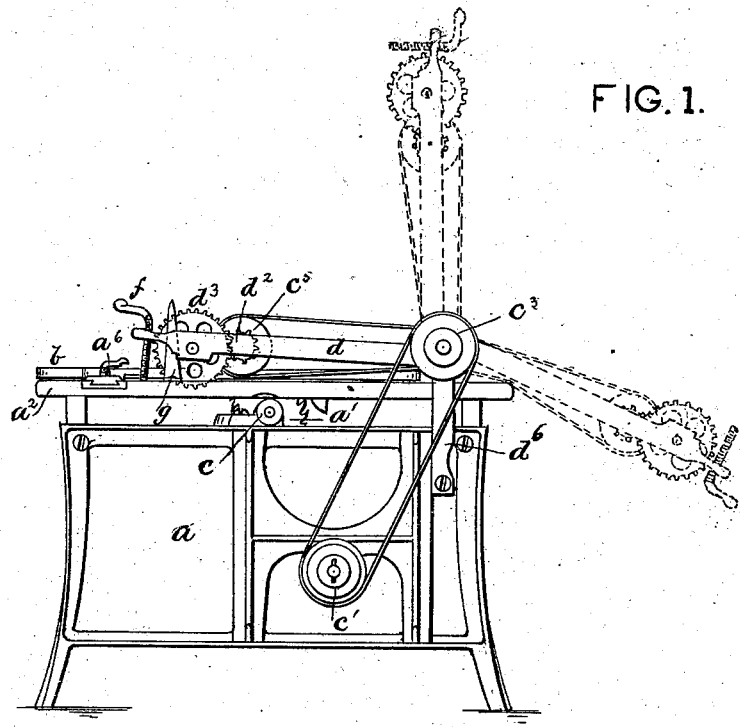
Figure 2:
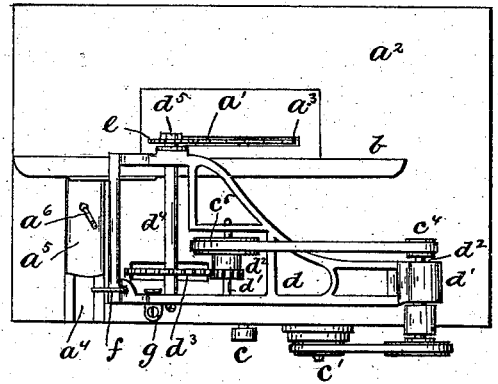

In the drawings, Figure 1 is a side elevation, and Fig. 2 is a plan, of my invention.

$a$ is the stand, on which is supported the saw $a'$ and the table $a^2$, slotted at $a^3$ to permit the saw to project through it, all of which are of ordinary construction.

In the table $a^2$ there is formed a cross-dovetail groove, $a^4$, in which is held a dovetail slide, $a^5$, to which is fixed the gage-bar $b$, which lies in the board $a^2$, parallel with the line of cut of the saw $a'$. By moving the slide $a^5$ the bar $b$ may be set at any desired distance from the saw, and can be rigidly fixed in place by a set-screw, $a^6$.

The saw is driven by a pulley (not shown in the drawings) placed on its shaft and under the board $a^2$, and on the outer end of this saw-shaft is placed a pulley, $c$, which connects by belt with a speed or cone pulley, $c'$, rigged to the side of the stand $a$.

$d$ is an adjustable frame, which is provided with a box or bearing, $d'$, which is placed on a shaft, $d^2$, journaled in the upper end of a standard, $d^6$. The lower end of the standard $d^6$ is fixed rigidly, by any suitable means, to the side of the stand $a$. On the outer end of the shaft $d^2$ is placed a pulley, $c^3$, connected by belt to the speed-pulley $c'$. When desired, the belt may be thrown around the pulleys $c$ and $c^3$ alone; but I prefer to interpose the speed-pulley, as shown.

On the inner end of the shaft $d^2$ is placed the pulley $c^4$, connected by belt to a pulley, $c^5$, on the shaft $d'$ of which is fixed a pinion, $d^2$, which meshes with a gear-wheel, $d^3$, on the shaft $d^4$. The shafts $d'$ $d^4$ are journaled in the side bars of the outer or swinging end of the frame $d$, and the shaft $d^4$ is arranged so that its end $d^5$ projects outward in front of the saw $a'$. On this outer projecting end, $d^5$, is fixed a feed-toothed disk, $e$, which is set immediately over the track in which the saw $a'$ will cut. This arrangement is made so that any marks made by the feed-disk will be cut out by the saw. The feed could be arranged to engage the plank on lines lateral to the line of the saw; but in very fine work the marks made by the teeth would be very objectionable.

On the outer or swinging end of the frame $d$ there is placed a set-screw, $f$, the lower end of which bears on the table $a^2$, and by it the end of the frame $d$ may be set higher or lower, to adapt it to planks of different thicknesses, or to give a stronger or weaker bite to the feed-wheel.

$g$ is a guide fixed at the side of the table, and arranged to so engage with the frame $d$ as to cause the latter to move in a vertical line when raised, and prevents it from swinging laterally.

The end of the frame $d$ may be raised to any desired height, or may be turned entirely off the table, as indicated in Fig. 1.

The motion in the feed mechanism can be stopped by throwing off the belt from the pulley $c$ or $c'$.

In the operation of the device the feed mechanism holds the plank more steadily to the table and gives a regular and steady feed. The rapidity of the feed can be regulated by the interposed speed-pulley $c'$.

The frame $d$ can be thrown over out of the way, so that the saw can be used without the automatic feed.

What I claim, and desire to secure by Letters Patent, is—

1. The combination of the frame $d$, hinged on the shaft $d^2$, the pulley $c^4$, fixed on the shaft $d^2$, concentric with the center of motion of the frame $d$, the feed-roll $e$, journaled in the outer or swinging end of the frame, the pulley $c^5$, journaled in and partaking of the motion of the frame and connected by suitable gearing to the feed-roll, the set-screw $f$, fixed adjustably in the outer or swinging end of the said frame, and the belt connecting the pulleys $c^4$ and $c^5$, substantially as set forth.

2. In combination with the feed-roll-carrying frame $d$, having one end hinged to the table $a^2$, the set-screw $f$, held in the frame $d$, and the guide $g$, fixed on the table and arranged to direct the vertical movement of the said feed-roll-carrying frame, substantially as set forth.

In testimony that I claim the foregoing I have hereunto set my hand and seal this 18th day of August, 1880.

JOSEPH H. HERMANCE. [L. S.]

Witnesses:
C. A. OZIAS,
E. B. JEWETT.